United States Patent
Cao et al.

(10) Patent No.: US 9,451,597 B2
(45) Date of Patent: Sep. 20, 2016

(54) METHOD AND APPARATUS FOR RECEIVING PHYSICAL UPLINK CONTROL CHANNEL IN LTE SYSTEM

(75) Inventors: Aijun Cao, Kista (SE); Jan Johansson, Kista (SE); Xiaoming Su, Shaanxi Province (CN); Yujie Li, Shaanxi Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 19 days.

(21) Appl. No.: 13/809,409

(22) PCT Filed: Jul. 9, 2010

(86) PCT No.: PCT/CN2010/075089
§ 371 (c)(1),
(2), (4) Date: Mar. 19, 2013

(87) PCT Pub. No.: WO2012/003643
PCT Pub. Date: Jan. 12, 2012

(65) Prior Publication Data
US 2013/0176841 A1    Jul. 11, 2013

(51) Int. Cl.
| | |
|---|---|
| H01J 11/00 | (2012.01) |
| H04W 72/04 | (2009.01) |
| H04L 1/00 | (2006.01) |
| H04L 1/16 | (2006.01) |
| H04L 27/26 | (2006.01) |
| H04L 5/00 | (2006.01) |

(52) U.S. Cl.
CPC ........ H04W 72/0413 (2013.01); H04L 1/0026 (2013.01); H04L 1/1671 (2013.01); H04L 5/0048 (2013.01); H04L 27/2613 (2013.01); H04L 5/0007 (2013.01)

(58) Field of Classification Search
CPC ............. H04L 1/1861; H04L 27/2613; H04L 5/0055; H04L 1/06; H04L 5/0048; H04L 27/2636; H04L 1/0668; H04L 27/2633; H04W 72/042; H04W 72/04; H04B 7/0669; H04B 7/0639; H04B 7/0678; H04J 13/18

USPC ......................................... 370/201, 328, 329
See application file for complete search history.

(56) References Cited

U.S. PATENT DOCUMENTS

| | | | |
|---|---|---|---|
| 2008/0273491 A1 | 11/2008 | Han et al. | |
| 2009/0303868 A1* | 12/2009 | Kimura | H04L 5/0053 370/210 |
| 2011/0228728 A1* | 9/2011 | Baligh | H04B 7/0669 370/328 |
| 2013/0136071 A1* | 5/2013 | Han | H04L 5/0019 370/329 |

FOREIGN PATENT DOCUMENTS

| | | |
|---|---|---|
| CN | 101267414 A | 9/2008 |
| CN | 101478379 A | 7/2009 |

OTHER PUBLICATIONS

International Search Report for PCT/CN2010/075089 dated Mar. 28, 2011.

* cited by examiner

Primary Examiner — Dang Ton
Assistant Examiner — Lionel Preval
(74) Attorney, Agent, or Firm — Ling Wu; Stephen Yang; Ling and Yang Intellectual Property (57) ABSTRACT

The present document discloses an apparatus for receiving Physical Uplink Control Channel (PUCCH) in Long Term Evolution (LTE) system, comprising: blocks of system FFT performing system FFT on data from a plurality of antennas, blocks of PUCCH RB processing units receiving the allocated logic resource index table and the local base sequence and output of the blocks of system FFT, and generating DMRS despread outputs and data values; a block of SR detection for receiving the data values and the DMRS despread outputs, and for generating SR detection results; blocks of user data extraction receiving data values and DMRS despread outputs, and performing user data extraction; blocks of PUCCH user processing units receiving an orthogonal sequence index, the data values and an output from blocks of user extraction, and generating a ACK/NAK/CQI signal for a concerned UE.

20 Claims, 7 Drawing Sheets

METHOD AND APPARATUS FOR RECEIVING PHYSICAL UPLINK CONTROL CHANNEL IN LTE SYSTEM

TECHNICAL FIELD

The present document relates to cellular telecommunication systems, and especially to method and apparatus for receiving PUCCH (Physical Uplink Control Channel) in LTE (Long Term Evolution) base-stations.

BACKGROUND

As the latest standard for cellular telecommunication systems, LTE (Long Term Evolution) system is ambitiously intended to provide mobile users with a much higher data rate than before, in the order of 100 Mbps via the air, which is the data rate of one cable connection in the early days. Furthermore, to be able to utilize the limited radio resources more efficiently, the radio resources should be divided into a smaller unit that can be assigned to one user. OFDM (Orthogonal Frequency Division Multiplex) is perfectly fit for those purposes by sharing all the radio resources at both frequency domain and time domain. Thus OFDMA is directly accepted for the downlink in LTE. And uplink SC-FDMA (Single Carrier Frequency Division Multiplex Access) is actually an DFT (Discrete Fourier Transform) spread OFDM.

Compared with the previous cellular telecommunication systems, such as WCDMA (Wide-band Code Division Multiple Access), LTE system reduces the overhead for the physical control signalling by discarding any dedication physical control channel and fast scheduling the control resources. That means, all of the defined physical control channels are shared by all of the users in one cell via fast scheduling by the scheduler. This also fits the bursty data transmission as well. And of course, there are new challenges to design the physical control channel receivers. According to the current LTE standard, the physical control channel in uplink is called PUCCH (Physical Uplink Control Channel). So, the new challenges are to design PUCCH receivers.

DISCLOSURE OF THE INVENTION

The objects of the present document are to provide methods and apparatuses for receiving PUCCH in LTE system. According to different purposes, there are two primary PUCCH formats defined which are labelled as PUCCH format 1 and PUCCH format 2, and several derivative PUCCH formats from these two primary formats. The principle of the present document can be applied to all CP (Cyclic Prefix) modes (e.g., normal CP mode and extended CP mode) and all PUCCH formats (e.g., PUCCH format 1 and PUCCH format 2). UEs share PUCCH by different cyclic shifts of the defined length-12 DMRS (DeModulation Reference Signal) combined with three orthogonal sequences.

An object of the present document is to provide an apparatus for receiving Physical Uplink Control Channel (PUCCH) in Long Term Evolution (LTE) system, comprising: a plurality of blocks of system FFT, each of the plurality of blocks of system FFT performing system FFT on data from corresponding one of a plurality of antennas; a block of allocated logic resource index table for generating an allocated logic resource index table; a block of local base sequence generator for generating a local base sequence; a plurality of blocks of PUCCH RB processing units, each of the plurality of blocks of PUCCH RB processing units receiving the allocated logic resource index table and the local base sequence and an output of corresponding one of the plurality of blocks of system FFT, and generating DMRS despread outputs and data values; a block of SR detection for receiving the data values and the DMRS despread outputs, and for generating SR detection results; a plurality of blocks of user data extraction, each of the plurality of blocks of user data extraction receiving the data values and the DMRS despread outputs, and performing user data extraction; and a plurality of blocks of PUCCH user processing units, each of the plurality of blocks of PUCCH user processing units receiving an orthogonal sequence index, the data values and an output from corresponding one of the plurality of blocks of user data extraction, and generating a ACK/NAK/CQI signal for a concerned UE; wherein one block of system FFT, one block of PUCCH RB processing unit, one block of user data extraction and one block of PUCCH user processing unit correspond to one antenna.

In accordance with a certain embodiment of the document, each of the plurality of blocks of PUCCH RB processing unit is configured to comprise: a sub-block of conjugate for receiving the local base sequence, and for generating a conjugate version of the local base sequence, a sub-block of RB extraction for receiving the allocated logic resource index table and the output of corresponding one of the plurality of blocks of system FFT, and for performing RB extraction; a sub-block of multiplication for receiving outputs from the sub-block of conjugate and the sub-block of RB extraction, and for performing multiplication calculation; a sub-block of SysVar removal for receiving an output of the sub-block of multiplication, and for generating complex symbols with symbol cyclic shift variation removed; a sub-block of 12-point IDFT for receiving an output of the sub-block of SysVar removal, and for performing 12-point IDFT, a sub-block of DMRS/data demux for receiving an output of the sub-block of 12-point IDFT, and for splitting DMRS symbols and Data symbols in one TTI to generate the data values and DMRS values, 36 sub-blocks of DMRS despreader for receiving the DMRS values, and for generating the DMRS despread outputs.

In accordance with a further embodiment of the document, the block of SR detection is configured to comprise: a plurality of sub-blocks of data despreader, each of the plurality of sub-blocks of data despreader receiving the data values and an unused orthogonal sequence, and performing inner product calculation; a sub-block of noise power estimate from data symbols for receiving outputs of the plurality of sub-blocks of data despreader, and for estimating an noise power over data symbols; a sub-block of noise power estimate from DMRS symbols for receiving the DMRS despread outputs from the plurality of blocks of PUCCH RB processing units, and for estimating an noise power over DMRS symbols; a sub-block of composite noise power for receiving the noise power over data symbols and the noise power over DMRS symbols, and for generating a composite noise power; and a sub-block of detection for receiving the composite noise power, and for performing detection to generate the SR detection results.

In accordance with a further embodiment of the document, the unused orthogonal sequence is [1 1 −1 −1].

In accordance with a further embodiment of the document, the sub-block of noise power estimate from data symbols is configured to calculated the noise power over data symbols as:

$$\sigma^2_{data} = \underset{a,n_s=0,1,\tau=0,\ldots,11}{Avg} \{|O(a, n_s, \tau)|^2\}, \text{ wherein}$$

$$O(a, n_s, \tau) = \frac{1}{4} \sum_{l=0,1,5,6} R_{cs}(a, n_s, l, \tau) \cdot W(l),$$

$W(0)=1, W(1)=1, W(5)=-1, W(6)=-1$; and a is a number of one antenna, $\tau$ is a cyclic shift, $n_s$ is a slot number, $R_{cs}(a, n_s, l, \tau)$ is a correlation results for slot $n_s$, symbol l and cyclic shift $\tau$ from the antenna of number a and can be obtained from the sub-block of DMRS/Data demux.

In accordance with a further embodiment of the document, the sub-block of noise power estimate from DMRS symbols is configured to calculated the noise power over DMRS as:

$$\sigma^2_{DMRS} = \frac{1}{T+1} \sum_{n \in \{u_0, u_1, \ldots, u_T\}} Z(n),$$

wherein $\{u_0, u_1, \ldots, u_T\}$ are unused positions which can be obtained from the allocated logic resource index table, $T+1$ is the number of the unused positions, and $Z(n)$ is the DMRS despread outputs.

In accordance with a further embodiment of the document, the sub-block of composite noise power is configured to calculate the composite noise power by averaging the noise power over DMRS symbols and the noise power over data symbols.

In accordance with a further embodiment of the document, a detection threshold of the sub-block of detection is set to a few dBs over the composite noise power.

In accordance with a further embodiment of the document, each of the plurality of blocks of PUCCH user processing unit is configured to comprise: a plurality of sub-blocks of data despreader, each of the plurality of sub-blocks of data despreader receiving the data values and the orthogonal sequence index, and performing inner product calculation; a sub-block of Maximum Ratio Combining (MRC) for receiving outputs from the plurality of sub-blocks of data despreader and outputs from the plurality of blocks of user data extraction; a sub-block of demodulation for receiving an output from the sub-block of MRC and for performing demodulation; and a sub-block of post processing for receiving and post processing an output from the sub-block of demodulation to generate the ACK/NAK/CQI signal for the concerned UE.

In accordance with a further embodiment of the document, the orthogonal sequence index is 0, 1, or 2.

Another object of the present document is to provide a method for receiving Physical Uplink Control Channel (PUCCH) in Long Term Evolution (LTE) system, comprising: performing system FFT on data from antennas to generate a system FFT output; generating an allocated logic resource index table; generating a local base sequence; generating DMRS despread outputs and data values by using the allocated logic resource index table, the local base sequence and the system FFT output; generating SR detection results by using the data values and the DMRS despread outputs; performing user data extraction by using the data values and the DMRS despread outputs to generate user data extraction outputs; and generating a ACK/NAK/CQI signal for a concerned UE by using an orthogonal sequence index, the data values and the user data extraction outputs.

In accordance with a certain embodiment of the document, the generating DMRS despread outputs comprises: generating a conjugate version of the local base sequence; performing RB extraction by using the allocated logic resource index table and the system FFT output to generate a RB extraction output; multiplying the conjugate version of the local base sequence with the RB extraction output to generate complex symbols; removing symbol cyclic shift variation of the complex symbols to generate complex symbols with the symbol cyclic shift variation removed; performing 12-point IDFT by using the complex symbols with the symbol cyclic shift variation removed to generate a 12-point IDFT output; performing DMRS/data demux by using the 12-point IDFT output to generate the data values and DMRS values; and performing DMRS despread by using the DMRS values to generate the DMRS despread outputs.

In accordance with a further embodiment of the document, the generating SR detection results comprises: performing data despread by using an unused orthogonal sequence and the data values to generate first data despreader outputs; estimating an noise power over data symbols by using the first data despreader outputs; estimating an noise power over DMRS symbols by using the DMRS despread outputs; generating a composite noise power by using the noise power over data symbols and the noise power over DMRS symbols; and performing detection to generate the SR detection results.

In accordance with a further embodiment of the document, the unused orthogonal sequence is [1 1 −1 −1].

In accordance with a further embodiment of the document, the estimating an noise power over data symbols comprises calculating the noise power over data symbols as:

$$\sigma^2_{data} = \underset{a,n_s=0,1,\tau=0,\ldots,11}{Avg} \{|O(a, n_s, \tau)|^2\}, \text{ wherein}$$

$$O(a, n_s, \tau) = \frac{1}{4} \sum_{l=0,1,5,6} R_{cs}(a, n_s, l, \tau) \cdot W(l),$$

$W(0)=1, W(1)=1, W(5)=-1, W(6)=-1$; and a is a number of one antenna, $\tau$ is a cyclic shift, $n_s$ is a slot number, $R_{cs}(a, n_s, l, \tau)$ is a correlation results for slot $n_s$, symbol l and cyclic shift $\tau$ from the antenna of number a and can be obtained by the performing DMRS/data demux.

In accordance with a further embodiment of the document, the estimating an noise power over DMRS symbols comprises calculating the noise power over DMRS symbols as:

$$\sigma^2_{DMRS} = \frac{1}{T+1} \sum_{n \in \{u_0, u_1, \ldots, u_T\}} Z(n),$$

wherein $\{u_0, u_1, \ldots, u_T\}$ are unused positions which can be obtained from the allocated logic resource index table, the $T+1$ is the number of the unused positions, and $Z(n)$ is the DMRS despread outputs.

In accordance with a further embodiment of the document, the generating a composite noise power comprises averaging the noise power over DMRS symbols and the noise power over data symbols.

In accordance with a further embodiment of the document, the performing detection to generate the SR detection results comprises using a detection threshold which is set to a few dBs over the composite noise power.

In accordance with a further embodiment of the document, the generating a ACK/NAK/CQI signal for a concerned UE comprises: performing data despread by using the data values and the orthogonal sequence index to generate second data despreader output; performing Maximum Ratio Combining (MRC) by using the second data despreader output and the user data extraction outputs to generate MRC output; performing demodulation by using the MRC output to generate a demodulation output; and performing post processing by using the demodulation output to generate the ACK/NAK/CQI signal for the concerned UE.

In accordance with a further embodiment of the document, the orthogonal sequence index is 0, 1, or 2.

DETAILED DESCRIPTION OF THE INVENTION

Figure 1:
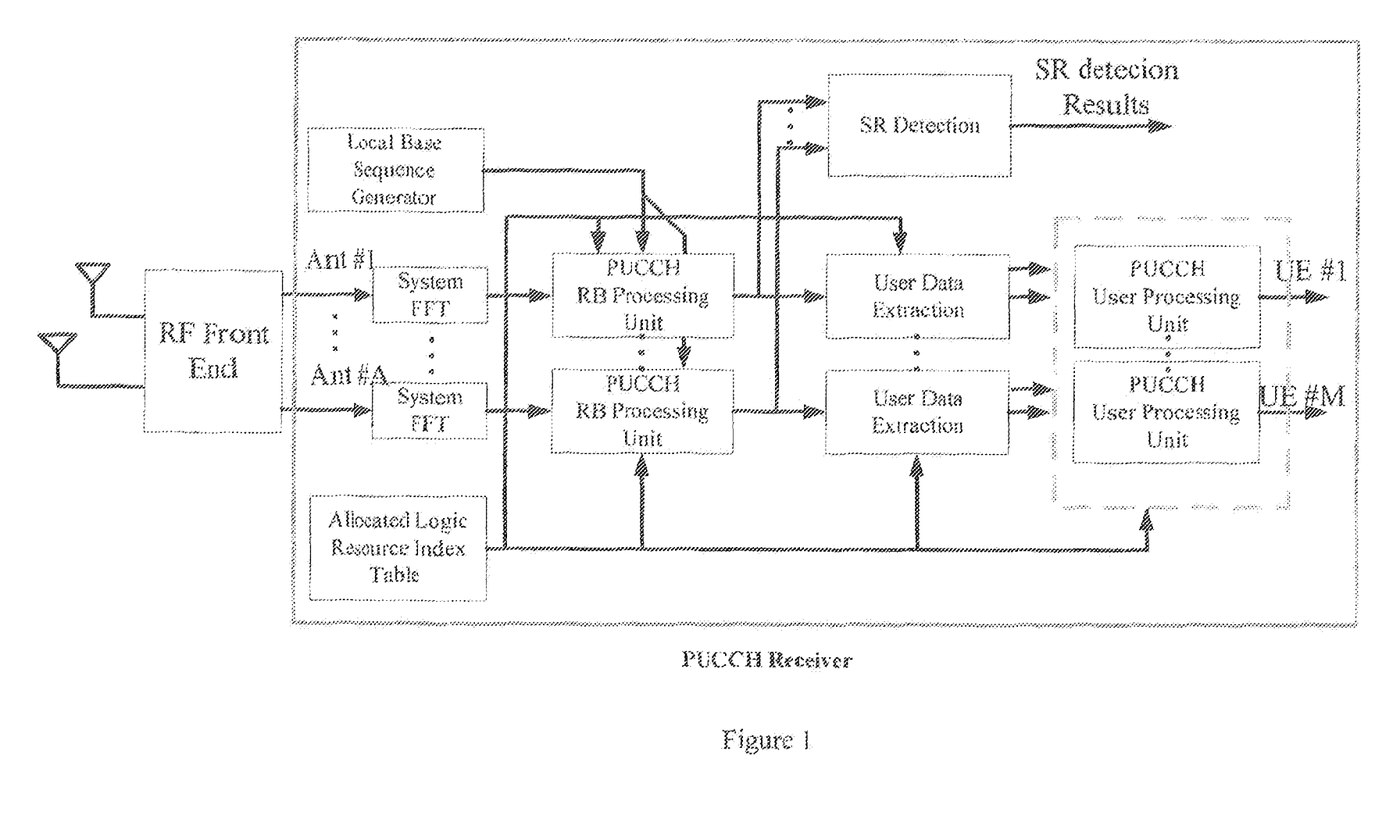
FIG. 1 shows a block diagram of the PUCCH receiver according to the present document.

An exemplary embodiment for receiving PUCCH in LTE system is showed in FIG. 1. The PUCCH receiver in FIG. 1 comprises a block of allocated logic resource index table, a block of local base sequence generator, a number of blocks of PUCCH RB processing units (the number is A, which is the number of antennas), a block of SR detection, a number of blocks of PUCCH user processing units (the number is A), a number of blocks of system FFT (the number is A), and a number of blocks of user data extraction (the number is A). Each block of PUCCH RB processing unit, each block of user data extraction, and each block of PUCCH user processing unit are all corresponding to one antenna. The signals from RF (Radio Frequency) front end are input into the blocks of system FFT. And these signals correspond to antennas with the number of A. The block of system FFT is always the first block in the PUCCH receiver, no matter which kind of receiver is applied. The block of user data extraction is defined by PUCCH resource allocation. Thus, the block of system FFT and the block of user data extraction are the same with those in prior art, which will not be explained in detail. So, the block of allocated logic resource index table, the block of local base sequence generator, the blocks of PUCCH RB processing units, the blocks of SR detection, and the blocks of PUCCH user processing units will be discussed in detail below.

The Block of Allocated Logic Resource Index Table

The block of allocated logic resource index table is used to generate allocated logic resource index table, and the generated allocated logic resource index table will be used in the block of PUCCH RB processing unit. Hereinafter, the generation of allocated logic resource index table will be described in detail.

Figure 2:
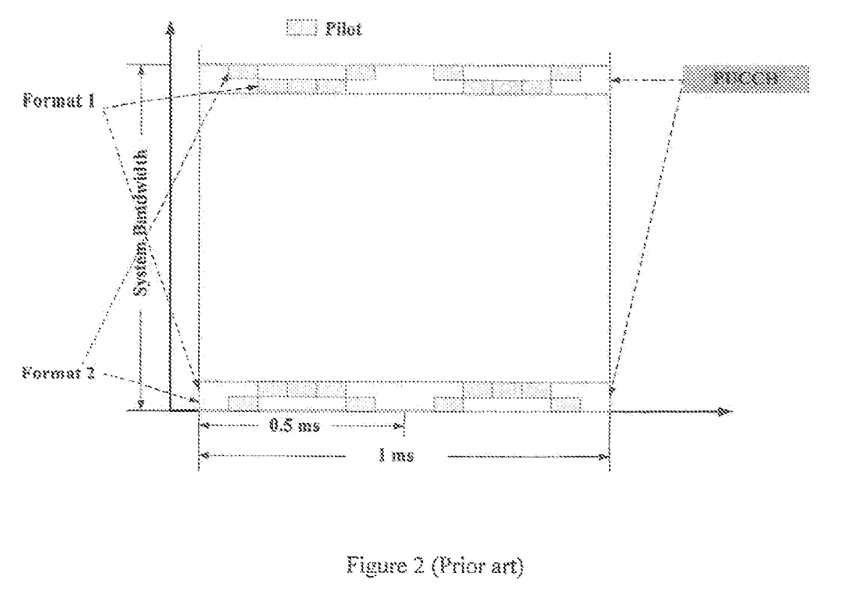
FIG. 2 shows a schematic diagram of PUCCH format 1 and PUCCH format 2 (Prior art)

The description will begin with PUCCH resource allocation. PUCCH is located at the both edge of the whole system bandwidth as shown in FIG. 2. PUCCH format 1 and PUCCH format 2 as mentioned above are also showed in FIG. 2. There is frequency hopping within one TTI (Transmission Time Interval) in order to obtain the frequency domain diversity gain.

There are five system parameters related to PUCCH resource allocation, the system parameters for PUCCH resource allocation can be expressed as:

$$\text{sys\_param\_PUCCH} = \{N_{RB}^{HO}, N_{CS}^{(1)}, N_{RB}^{(2)}, c, \Delta_{SHIFT}^{PUCCH}\},$$

Wherein $N_{RB}^{HO}$: number of RBs (Resource Blocks) reserved for PUCCH;

$N_{CS}^{(1)}$: $\{0, 1, \ldots, 7\}$, number of cyclic shifts used for PUCCH format 1 in the mixed RB for format 1 and format 2;

$N_{RB}^{(2)}$: number of RBs purely used for PUCCH format 2;

c: spreading sequence length, c is 3 in case of normal CP and c is 2 in case of extended CP;

$\Delta_{SHIFT}^{PUCCH}$: distance between two adjacent sequences used in PUCCH.

Figure 3:
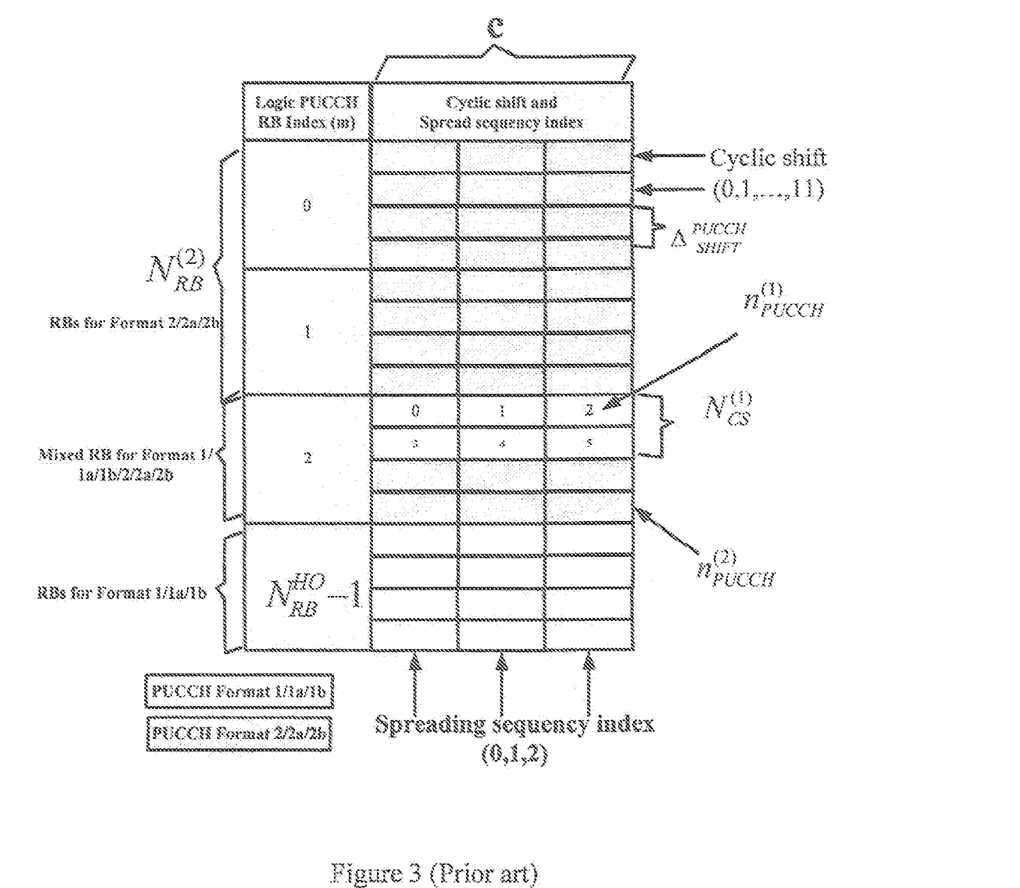
FIG. 3 shows the overall layout for PUCCH resource allocation (Prior art)

The above five system parameters directly determine the layout of resource blocks reserved for PUCCH. Furthermore, FIG. 3 illustrates the overall layout for PUCCH resource allocation.

So physical resource in terms of RB position, cyclic shift, and spreading sequence index (or orthogonal sequence index) can be directly derived from the two logic resource indices $n_{PUCCH}^{(1)}$ and $n_{PUCCH}^{(2)}$ for format 1 and format 2 respectively, wherein $n_{PUCCH}^{(1)}$ and $n_{PUCCH}^{(2)}$ are known parameters in the art. The way to derive RB position, cyclic shift, and spreading sequence index is prior art and will not be described in detail. ENodeB stores the logical index for each UE as the logic resource index table. Table 1 shows an example of the logic resource index table generated. RB number, cyclic shift $\Delta_{cs}$, and orthogonal sequence index $n_{oc}(n_s)$ are shown in table 1 which is derived from the standard.

TABLE 1

| Logical Resource Index | Logical RB Idx (m) | first slot $\Delta_{cs}$ | first slot $n_{oc}(n_s)$ | second slot $\Delta_{cs}$ | second slot $n_{oc}(n_s)$ |
|---|---|---|---|---|---|
| 0 | 2 | 0 | 0 | 0 | 2 |
| 1 |   | 2 | 0 | 2 | 0 |
| 2 |   | 4 | 0 | 3 | 1 |
| 3 |   | 1 | 1 | 2 | 2 |
| 4 |   | 3 | 1 | 4 | 0 |
| 5 |   | 5 | 1 | 5 | 1 |
| 6 |   | 0 | 2 | 4 | 2 |
| 7 |   | 2 | 2 | 0 | 0 |
| 8 |   | 4 | 2 | 1 | 1 |

The allocated logic resource index table will be used in the blocks of PUCCH RB processing units, in the blocks of user data extraction, and in the blocks of PUCCH user processing units. The use of the allocated logic resource index table will be discussed below.

The Block of Local Base Sequence Generator

The block of local base sequence generator is used to generate local base sequence, and the generated local base sequence will be used in the block of PUCCH RB processing unit. Hereinafter, the generation of local base sequence will be described in detail.

The local base sequence is a length-12 sequence, which is generated by the block of local base sequence generator in the following way:

$$\bar{r}_{u,v}(n) = e^{j\phi(n)\pi/4}, \quad 0 \le n \le M_{sc}^{RS}-1,$$ Equation 1 wherein u is group number, $u \in \{0, 1, 2, \ldots, 29\}$, v is base sequence number in one group, and the values of v are 0 and 1. The local base sequence can be grouped by u and v. $M_{sc}^{RS}$ is the length of the reference sequence and the values of $\phi(n)$ are given by table 2, which is Table 5.5.1.2-1 in 3GPP TS36.211. In table 2, $N_{sc}^{RB}$ is the number of sub-carriers per RB, which is 12. In this embodiment, the length of the reference sequence equals to the length of the local base sequence. Since $M_{sc}^{RS}=12$, thus $0 \le n \le 11$. It is noted that the reference sequence is a certain cyclic shift of the local base sequence. Specifically, the reference sequence for a user varies slot by slot, but the local base sequence is the same.

From equation 1, it can be known that the local base sequence can still be expressed in terms of complex number, for example, $\pm 1 \pm j$. In computation of complex number, multiplication can be converted to addition. Therefore, no multiplication but addition is required.

The use of local base sequence generated in the blocks of PUCCH RB processing units will be discussed with reference to the block of PUCCH RB processing unit.

TABLE 2

Definition of $\phi(n)$ for $M_{sc}^{RS} = N_{sc}^{RB}$

| u | $\phi(0), \ldots, \phi(11)$ |
|---|---|
| 0 | -1  1  3 -3  3  3  1  1  3  1 -3  3 |
| 1 |  1  1  3  3  3 -1  1 -3 -3  1 -3  3 |
| 2 |  1  1 -3 -3 -3 -1 -3 -3  1 -3  1 -1 |
| 3 | -1  1  1  1  1 -1 -3 -3  1 -3  3 -1 |
| 4 | -1  3  1 -1  1 -1 -3 -1  1 -1  1  3 |
| 5 |  1 -3  3 -1 -1  1  1 -1 -1  3 -3  1 |
| 6 | -1  3 -3 -3 -3  3  1 -1  3  3 -3  1 |
| 7 | -3 -1 -1 -1  1 -3  3 -1  1 -3  3  1 |
| 8 |  1 -3  3  1 -1 -1  1  1  3 -1  1 |
| 9 |  1 -3 -1  3  3 -1 -3  1  1  1  1  1 |
| 10| -1  3 -1  1  1 -3 -3 -1 -3 -3  3 -1 |
| 11|  3  1 -1 -1  3  3 -3  1  3  1  3  3 |
| 12|  1 -3  1  1 -3  1  1  1 -3 -3 -3  1 |
| 13|  3  3 -3  3 -3  1  1  3 -1 -3  3  3 |
| 14| -3  1 -1 -3 -1  3  1  3  3  3 -1  1 |
| 15|  3 -1  1 -3 -1 -1  1  1  3  1 -1 -3 |
| 16|  1  3  1 -1  1  3  3  3 -1 -1  3 -1 |
| 17| -3  1  1  3 -3  3 -3 -3  3  1  3 -1 |
| 18| -3  3  1  1 -3  1 -3 -3 -1 -1  1 -3 |
| 19| -1  3  1  3  1 -1 -1  3 -3 -1 -3 -1 |
| 20| -1 -3  1  1  1  1  3  1 -1  1 -3 -1 |
| 21| -1  3 -1  1 -3 -3 -3 -3 -3  1 -1 -3 |
| 22|  1  1 -3 -3 -3 -3 -1  3 -3  1 -3  3 |
| 23|  1  1 -1 -3 -1 -3  1 -1  1  3 -1  1 |
| 24|  1  1  3  1  3  3 -1  1 -1 -3 -3  1 |
| 25|  1 -3  3  3  1  3  3  1 -3 -1 -1  3 |
| 26|  1  3 -3 -3  3 -3  1 -1 -1  3 -1 -3 |
| 27| -3 -1 -3 -1 -3  3  1 -1  1  3 -3 -3 |
| 28| -1  3 -3  3 -1  3  3 -3  3  3 -1 -1 |
| 29|  3 -3 -3 -1 -1 -3 -1  3  3  1 -1 |

The Blocks of PUCCH RB Processing Units

The blocks of PUCCH RB processing units are used to obtain DMRS despread outputs. Hereinafter, the processing of the blocks of PUCCH RB processing units will be described in detail.

Figure 4:
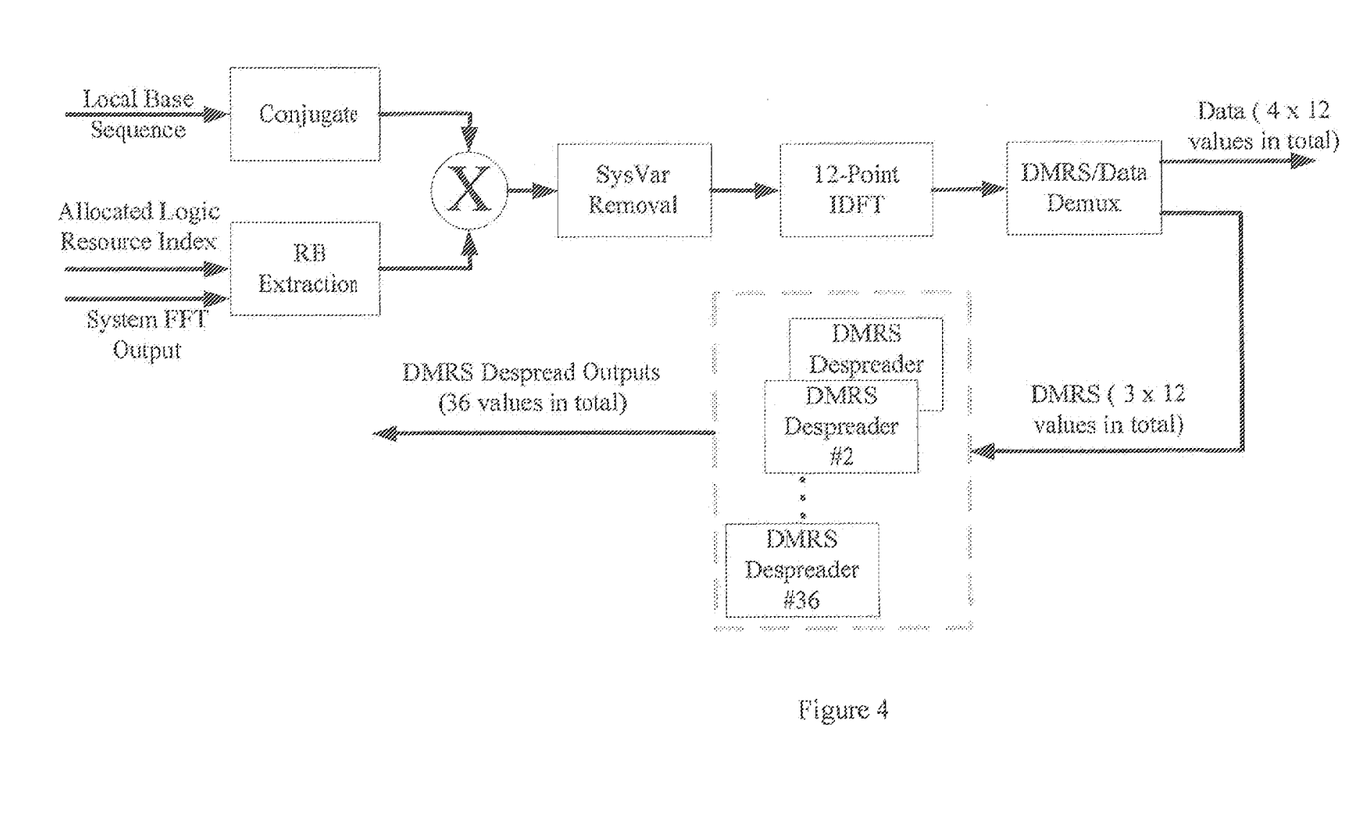
FIG. 4 shows a block diagram of the PUCCH RB processing unit according to the present document.

FIG. 4 shows the details of the blocks of PUCCH RB processing units. The blocks of PUCCH RB processing units each comprises a sub-block of conjugate, a sub-block of RB extraction, a sub-block of multiplication, a sub-block of SysVar removal, a sub-block of 12-point IDFT, a sub-block of DMRS/data demux, 36 sub-blocks of DMRS despreader (to generate 36 values in total). The local base sequence generated by the block of local base sequence generator is input into the sub-block of conjugate, the allocated logic resource index table generated by the block of allocated logic resource index table and the system FFT outputs are input into the sub-block of RB extraction. The output from the sub-block of conjugate is multiplied with the output from the sub-block of RB extraction. And the result of the multiplication is input into the sub-block of SysVar removal. The signal flow is as shown in FIG. 4.

The local base sequence from the local base sequence generator is input into the sub-block of conjugate, to obtain a conjugate version of the local base sequence. The sub-block of RB extraction uses the relationship between the logic index of RB and the physical index of RB which is clearly defined in the standard. For example, if the concerned UE is assigned with RB #20, then just extract the 12 points corresponding to RB #20 from the system FFT outputs. The conjugate complex is multiplied with the output from the sub-block of RB extraction. This multiplication processing together with the processing of the sub-block of 12-point IDFT is used for calculating convolution between the received signal and the local base sequence.

The sub-block of SysVar removal is to remove the arbitrary cyclic shift in each symbol. The processing of the sub-block of SysVar removal will be described in detail below.

The input to the sub-block of SysVar_Removal is:

R(k): The received 12 complex symbols from the output of the multiplier for one SC-FDMA symbol.

The output from the sub-block of SysVar_Removal is:

R'(k): 12 complex symbols whose symbol cyclic shift variation has been removed.

The parameters will be used comprise:

$n_s$: (0, 1, ..., 19), slot number where the input SC-FDMA symbol is located;

l: SC-FDMA symbol number within one slot (0, ..., 6 for normal CP, 0, ..., 5 for extended CP mode);

$n_{PUCCH}^{(1)}$: logical resource index of PUCCH for the concerned UE, which is mentioned with reference to FIG. 3;

$N_{ID}^{cell}$: Cell ID

Now, the principle for the sub-block of SysVar removal will be described in detail below:

(a) Execute the following calculations only once per each $n_{PUCCH}^{(1)}$.

$$n_{PUCCH}^{(1)} \to \begin{Bmatrix} N' \\ m \\ n_s \end{Bmatrix} \to n'(n_s) \to n_{oc}(n_s) \to \Delta_{cs}$$

From the above formula, it can be seen that N', m are obtained from $n_{PUCCH}^{(1)}$ first, then $n'(n_s)$ is obtained, and then the spreading sequence number $n_{oc}(n_s)$ is obtained, at last the cyclic shift $\Delta_{cs}$ is obtained. Here, N', m, $n'(n_s)$ are intermediate variables and do not have physical meanings For a given $n_{PUCCH}^{(1)}$ calculate N' as $$N' = \begin{cases} N_{CS}^{(1)} & \text{if } n_{PUCCH}^{(1)} < \dfrac{c \cdot N_{CS}^{(1)}}{\Delta_{SHIFT}^{PUCCH}} \\ 12 & \text{otherwise,} \end{cases}$$

and calculate m as:

$$m = \begin{cases} N_{RB}^{(2)} & \text{if } n_{PUCCH}^{(1)} < c \cdot N_{cs}^{(1)} / \Delta_{SHIFT}^{PUCCH} \\ \left\lfloor \dfrac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \dfrac{N_{cs}^{(1)}}{8} \right\rceil & \text{otherwise} \end{cases}$$

wherein, $c = \begin{cases} 3 & \text{normal cyclic prefix} \\ 2 & \text{extended cyclic prefix} \end{cases}$ Then according to the slot number $n_s$, further calculate the intermediate variable $n'(n_s)$.

For the first slot in one sub-frame:

$$n'(n_s) = \begin{cases} n_{PUCCH}^{(1)} & \text{if } n_{PUCCH}^{(1)} < c \cdot N_{cs}^{(1)} / \Delta_{shift}^{PUCCH} \\ (n_{PUCCH}^{(1)} - c \cdot N_{cs}^{(1)} / \Delta_{shift}^{PUCCH}) \bmod (c \cdot N_{sc}^{RB} / \Delta_{shift}^{PUCCH}) & \text{otherwise} \end{cases}$$

for format 1; and $$n'(n_s) = \begin{cases} n_{PUCCH}^{(2)} \bmod N_{sc}^{RB} & \text{if } n_{PUCCH}^{(2)} < N_{sc}^{RB} N_{RB}^{(2)} \\ (n_{PUCCH}^{(2)} + N_{cs}^{(1)} + 1) \bmod N_{sc}^{RB} & \text{otherwise} \end{cases}$$

for format 2.

For the second slot in one sub-frame:

$$n'(n_s) =$$

$$\begin{cases} [c(n'(n_s-1)+1)] \bmod \left( \dfrac{cN_{sc}^{RB}}{\Delta_{shift}^{PUCCH}} + 1 \right) - 1 & n_{PUCCH}^{(1)} \geq c \cdot \dfrac{N_{cs}^{(1)}}{\Delta_{shift}^{PUCCH}} \\ \left\lfloor \dfrac{h}{c} \right\rfloor + (h \bmod c) \dfrac{N'}{\Delta_{shift}^{PUCCH}} & \text{otherwise,} \end{cases}$$

$h = (n'(n_s - 1) + d) \bmod (cN' / \Delta_{shift}^{PUCCH})$, wherein, $$d = \begin{cases} 2 & \text{normal cyclic prefix} \\ 0 & \text{extended cyclic prefix} \end{cases}$$

for format 1; and $$n'(n_s) = \begin{cases} [N_{sc}^{RB}(n'(n_s-1)+1)] \bmod(N_{sc}^{RB}+1) - 1 & \text{if } n_{PUCCH}^{(2)} < N_{sc}^{RB} N_{RB}^{(2)} \\ (N_{sc}^{RB} - 2 - n_{PUCCH}^{(2)}) \bmod N_{sc}^{RB} & \text{otherwise} \end{cases}$$

for format 2.

Then calculate the spreading sequence number $n_{oc}(n_s)$ as $$n_{oc}(n_s) = \begin{cases} \lfloor n'(n_s) \cdot \Delta_{shift}^{PUCCH} / N' \rfloor & \text{for normal cyclic prefix} \\ 2 \cdot \lfloor n'(n_s) \cdot \Delta_{shift}^{PUCCH} / N' \rfloor & \text{for extended cyclic prefix} \end{cases}$$

The cyclic shift $\Delta_{cs}$ is obtained according to its definition, that is, by looking up the allocation table.

It is noted that in table 1, $n_{oc}(n_s)$ and $\Delta_{cs}$ derived from $n_{PUCCH}^{(1)}$ and $n_{PUCCH}^{(2)}$ are only for n(1)_PUCCH, while $n_{oc}(n_s)$ and $\Delta_{cs}$ calculated above are for n(1)_PUCCH and n(2)_PUCCH.

Then calculate the cyclic shifts for symbol l in slot n_s (the slot with number of $n_s$) for the concerned UE, $n_{cs}(n_s, l)$ and the common cyclic shift for symbol l in slot n_s for all the UEs in the cell, $n_{cs}^{cell}(n_s, l)$ as $$n_{cs}(n_s, l) = \begin{cases} \left[ \begin{array}{l} n_{cs}^{cell}(n_s, l) + (n'(n_s) \cdot \Delta_{shift}^{PUCCH} + \\ (n_{oc}(n_s) \bmod \Delta_{shift}^{PUCCH})) \bmod N' \end{array} \right] \bmod N_{sc}^{RB} & \text{for normal cyclic prefix} \\ [n_{cs}^{cell}(n_s, l) + (n'(n_s) \cdot \Delta_{shift}^{PUCCH} + n_{oc}(n_s)/2) \bmod N'] \bmod N_{sc}^{RB} & \text{for extended cyclic prefix} \end{cases}$$

$$n_{cs}^{cell}(n_s, l) = \sum_{i=0}^{7} c(8N_{symb}^{UL} \cdot n_s + 8l + i) \cdot 2^i.$$

Wherein, $N_{symb}^{UL}$ is the number of OFDM symbols per slot, it is 7 for normal CP and 6 for extend CP, and $c(n)=(x_1(n+N_c)+x_2(n+N_c)) \bmod 2$ $x_1(n+31)=(x_1(n+3)+x_1(n)) \bmod 2$, $x_2(n+31)=(x_2(n+3)+x_2(n+2)+x_2(n+1)+x_2(n)) \bmod 2$ with Nc=1600.

There are two m-sequence generators to generate random numbers which are used in LTE system. The first m-sequence is initialized with $x_1(0)=1$, $x_1(n)=0$, n=1, 2, ..., 30. The second m-sequence is initialized with $c_{init}=N_{ID}^{cell}$, $c_{init}$ is initial values of the shift registers in the second m-sequence generator.

(b) Remove the symbol cyclic shift variation.

$$R'(k) = e^{-j\frac{2\pi}{12}k \cdot n_{cs}^{cell}(n_s, l)} R(k).$$

Thus, the output of the sub-block of SysVar_Removal, R'(k), is the complex symbols whose symbol cyclic shift variation has been removed.

As stated above, the sub-block of 12-point IDFT together with complex multiplication is used for the calculation of the convolution. The sub-block of DMRS/Data Demux is used to split DMRS and Data symbols in one TTI. The outputs of the sub-block of DMRS/Data Demux are N×12 data values and M×12 DMRS values, where N represents the number of data symbols in one slot and M represents the number of DMRS symbols in one slot. For example, for PUCCH format 1 in normal CP mode, there are 7 symbols in each slot, and symbol 0/1/5/6 are the data symbols, and symbol 2/3/4 are the DMRS symbols. Then, the outputs of the sub-block of DMRS/Data Demux are 4×12 data values and 3×12 DMRS values.

The sub-block of DMRS despreader is used to obtain the inner product of the orthogonal sequence and the received sequence. The orthogonal sequences are defined in table 3. In table 3, $N_{SF}^{PUCCH}$ is the length of the orthogonal sequences, which is 3 in this case.

TABLE 3

Spread sequences for PUCCH DMRS

| Sequence index $n_{oc}(n_s)$ | Orthogonal sequences $[w(0) \Lambda \, w(N_{SF}^{PUCCH} - 1)]$ |
|---|---|
| 0 | [1 1 1] |
| 1 | [1 $e^{j2\pi/3}$ $e^{j4\pi/3}$ |
| 2 | [1 $e^{j4\pi/3}$ $e^{j2\pi/3}$] |

By means of the sub-blocks in FIG. 4, the DMRS despread outputs can be obtained. In these sub-blocks, the sub-block of SysVar_Removal for removing cyclic shift is a key sub-block.

The Block of PUCCH SR (Scheduling Request) Detection

The block of PUCCH SR detection is used to obtain the SR detection results. Hereinafter, the SR detection of the block of PUCCH SR detection will be described in detail.

Figure 5:
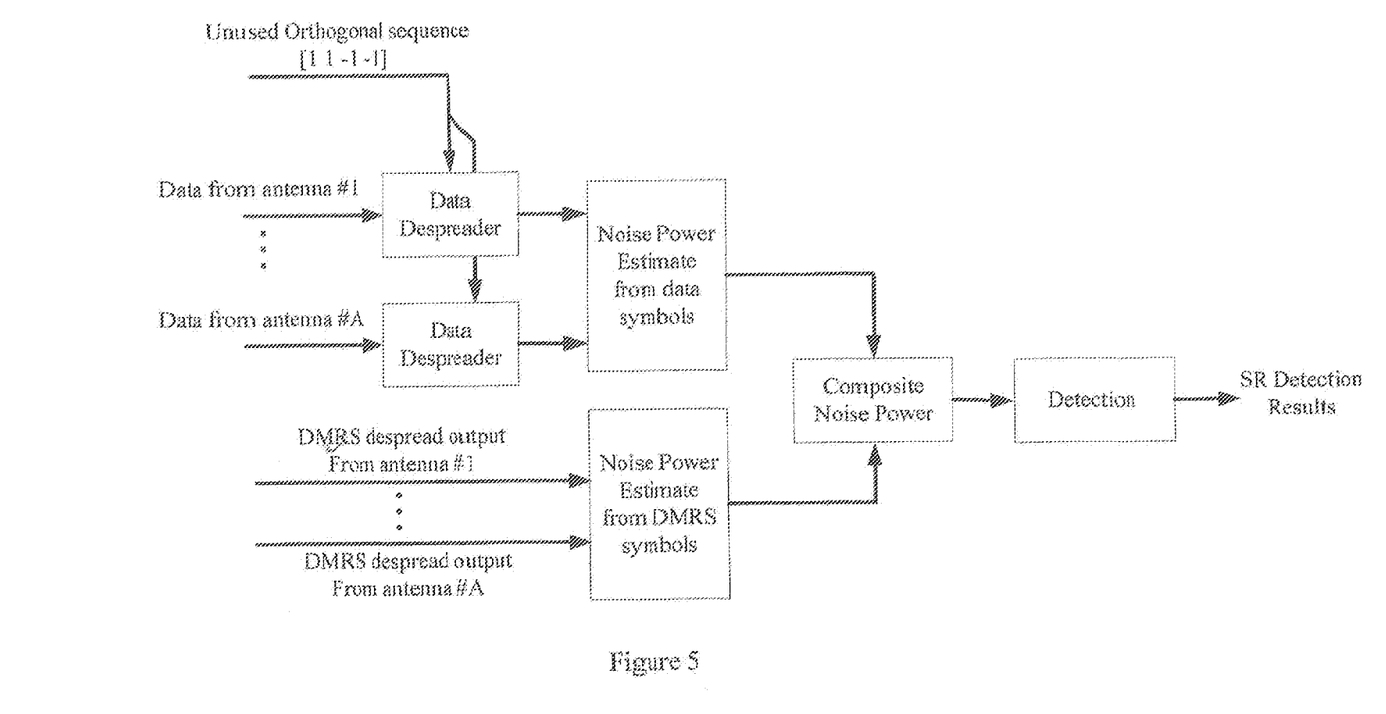
FIG. 5 shows a block diagram for PUCCH SR detection according to the present document.

FIG. 5 shows the details of the block of PUCCH SR detection. The block of PUCCH SR detection comprises a number of sub-blocks of data despreader (the number is A.), a sub-block of noise power estimate from data symbols, a sub-block of noise power estimate from DMRS symbols, a sub-block of composite noise power, and a sub-block of detection. Data from antenna #1, #2, . . . , #A are input into the corresponding sub-block of data despreader respectively. The outputs from the sub-blocks of data despreader are input into the sub-block of noise power estimate from data symbols. DMRS despread outputs from antenna #1, #2, . . . , #A output from blocks of PUCCH RB processing unit are input into the sub-block of noise power estimate from DMRS symbols. The outputs from the sub-blocks of noise power estimate from data symbols and the sub-block of noise power estimate from DMRS symbols are all input into the sub-block of composite noise power. Then the output from the sub-block of composite noise power is input into the sub-block of detection to obtain SR detection results.

In FIG. 5, the unused orthogonal sequence will always be [1 1 -1 -1]. The sub-block of data despreader is used to obtain the inner product of the orthogonal sequence and the received sequence.

The noise power can be estimated over both data symbols and DMRS.

For the noise power estimate over data symbols:

As stated below, the unused orthogonal sequence [1 1 -1 -1] can be applied to make one estimate on the noise power due to its orthogonality to all the other three orthogonal sequences, the other three orthogonal sequences are [1,1,1,1], [1,-1,1,-1], [1,-1,-1,1] defined in the protocol, which are in table 4:

TABLE 4

Spread sequences for PUCCH Data symbol

| Sequence index $n_{oc}(n_s)$ | Orthogonal sequences $[w(0) \Lambda \, w(N_{SF}^{PUCCH} - 1)]$ |
|---|---|
| 0 | [+1 +1 +1 +1] |
| 1 | [+1 -1 +1 -1] |
| 2 | [+1 -1 -1 +1] |
| 3 | [+1 +1 -1 -1] |

De-Walsh by using the unused orthogonal sequence ([1 1 -1 -1]) for each cyclic shift:

$$O(a, n_s, \tau) = \frac{1}{4} \sum_{l=0,1,5,6} R_{cs}(a, n_s, l, \tau) \cdot W(l),$$

wherein W(0)=1, W(1)=1, W(5)=-1, W(6)=-1; and a is the number of receive antennas, $\tau$ is the cyclic shift, $R_{cs}(a, n_s, l, \tau)$ is the correlation results for slot n_s, symbol l and cyclic $\tau$ from the antenna of number a. $R_{cs}(a, n_s, l, \tau)$ can be output from the sub-block of DMRS/Data demux in FIG. 4.

Calculate the noise power based on $O(a, n_s, \tau)$ for all slots, all receive antennas and all cyclic shifts:

$$\sigma_{data}^2 = \underset{a, n_s=0,1, \tau=0,\ldots,11}{Avg} \{|O(a, n_s, \tau)|^2\}.$$

And for the noise power estimate over DMRS:

according to the calculation specified with reference to the sub-block of SysVar_Removal, derive the unused positions $\{u_0, u_1, \ldots, u_T\}$ in the detection window based on the input $n_{PUCCH}^{(1)}$ values. This can be done by looking up the allocated logic resource index table to find out the used positions, and then the unused positions can be derived.

Calculate the noise power as:

$$\sigma_{DMRS}^2 = \frac{1}{T+1} \sum_{n \in \{u_0, u_1, \ldots, u_T\}} Z(n);$$

wherein Z(n) is the output of the DMRS despreader, T+1 is the number of unused positions.

If both noise power estimates are available, then compute a composite noise power estimate just by the simple average in the sub-block of composite noise power:

$$\sigma^2 = \frac{\sigma_{data}^2 + \sigma_{DMRS}^2}{2}.$$

The detection threshold the sub-block of detection is set to a few dBs over the noise power calculated above. Then perform the detection to obtain SR detection results.

Figure 6:
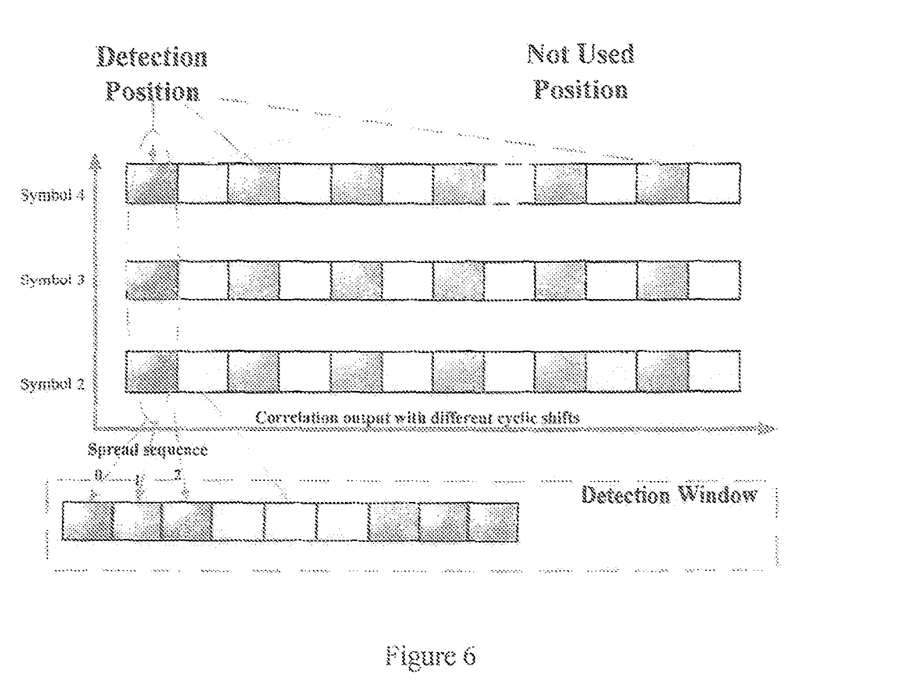
FIG. 6 shows a detection window of size 36 for PUCCH SR detection.

According to the present document, the so-called detection window of size 36 is formed as FIG. 6. In FIG. 6, each row of 12 values represent the output of the IDFT for symbol 2/3/4 respectively, and each column represents 3 values with the same cyclic shift (0, 1, . . . , 11). And one spread sequence of length 3 can be applying to the 3 values with the same cyclic shift to obtain 1 de-spread output, and each set of 3 values can have 3 de-spread outputs since there are 3 spread sequences. Thus as FIG. 6 shows, there are 3*12=36 de-spread outputs which consist of the whole detection window.

The Blocks of PUCCH User Processing Units

The blocks of PUCCH user processing units are used to obtain ACK/NAK/CQI for the concerned UE. Hereinafter, the processing of the blocks of PUCCH user processing units will be described in detail.

Figure 7:
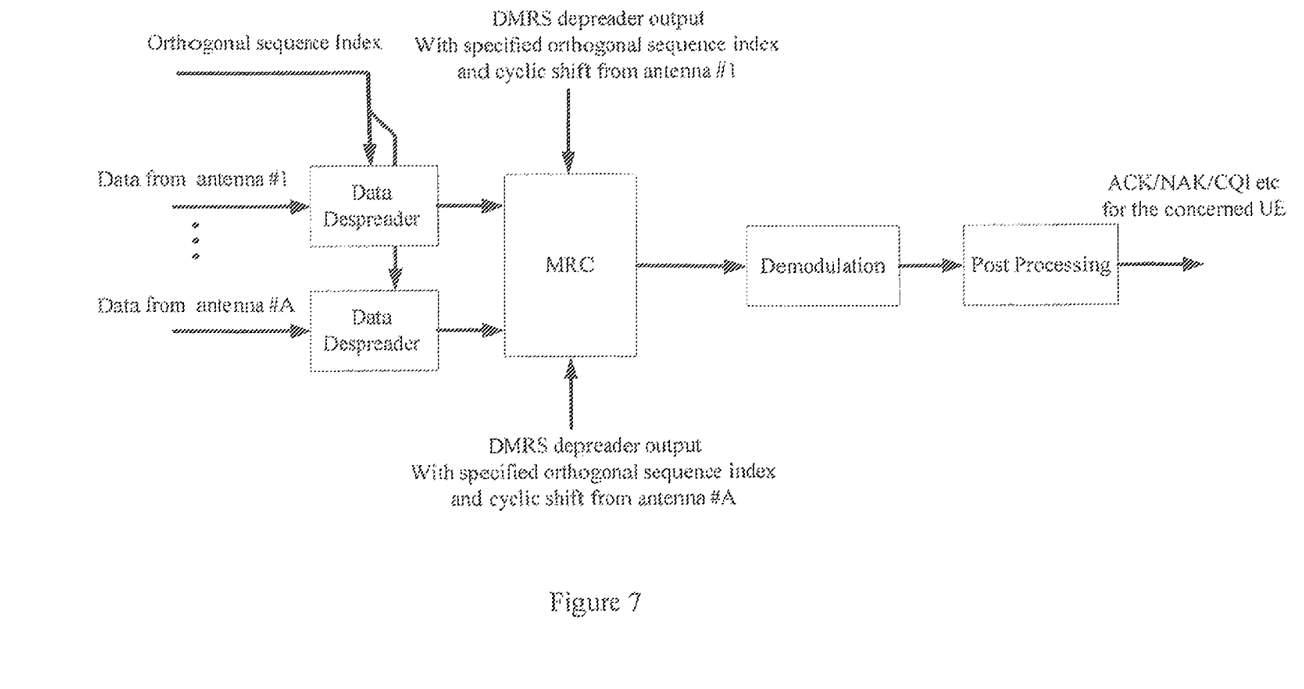
FIG. 7 shows a block diagram of PUCCH user processing unit according to the present document.

FIG. 7 shows the details of the block of PUCCH user processing unit. The block of PUCCH user processing unit comprises a number of sub-blocks of data despreader (the number is A.), a sub-block of MRC (Maximum Ratio Combining), a sub-block of demodulation, and a sub-block of post processing. Data from antenna #1, . . . , #A are input into the sub-blocks of data despreader respectively. Orthogonal sequence index (0 or 1 or 2) is also input into the sub-block of data despreader. DMRS depreader outputs with specified orthogonal sequence index and cyclic shift from antenna #1, . . . , #A output from the blocks of user data extraction are input into the sub-block of MRC. The output from the sub-block of MRC is demodulated in the sub-block of demodulation. Then the output from the sub-block of demodulation is post processed in the sub-block of post processing to obtain ACK/NAK/CQI etc. signals for the concerned UE.

For data symbols, it can be despread at first according to the assigned physical resources. The data symbols input into the sub-block of data despreader and the processing of the sub-block of data despreader in FIG. 7 is the same with the data symbols input into the sub-block of data despreader and the processing of the sub-block of data despreader in FIG. 5.

Again, with reference to table 4, the sequence index is defined to 0, 1, 2 and 3. However, it is noted that the sequence index "3" is not defined in the standard, but defined here instead in order to estimate the noise power based on the data symbols. Specifically, index 3 is the unused orthogonal sequence to be used for the noise power calculation described above. This is one of the key points in this document.

The sub-block of demodulation is the same with that in the prior art, and will not be described in detail.

For post-processing, it can refer to the Reed-Muller decoder after demodulation for PUCCH format 2. For PUCCH format 1, the post-processing may be complex. The purpose of the post-processing is to obtain ACK/NAK/CQI for the concerned UE, which will not be described in detail here.

The outputs from the PUCCH receiver are SR detection results from the block of SR detection and ACK/NAK/CQI for the concerned UE from PUCCH user processing unit.

From the above description, the block of allocated logic resource index table, the block of local base sequence generator, the blocks of PUCCH RB processing units, the blocks of SR detection, and the blocks of PUCCH user processing units, which are presented by the present document, contribute to the apparatus for receiving PUCCH in LTE system.

According to the embodiments of the apparatuses for receiving PUCCH, there are the corresponding embodiments of the methods for receiving PUCCH. In one embodiment, with reference to FIG. 1, the method comprises the following steps:

(1) performing system FFT on data from antennas to generate a system FFT output;

(2) generating an allocated logic resource index table;

(3) generating a local base sequence;

(4) generating DMRS despread outputs and data values by using the allocated logic resource index table, the local base sequence and the system FFT output;

(5) generating SR detection results by using the data values and the DMRS despread outputs;

(6) performing user data extraction by using the data values and the DMRS despread outputs to generate user data extraction outputs, which is to extract data for the concerned user; and (7) generating a ACK/NAK/CQI signal for a concerned UE by using an orthogonal sequence index, the data values and the user data extraction outputs.

In another embodiment, with reference to FIG. 4, the step of generating the DMRS despread outputs comprises:

(4*a*) generating a conjugate version of the local base sequence;

(4*b*) performing RB extraction by using the allocated logic resource index table and the system FFT output to generate a RB extraction output;

(4*c*) multiplying the conjugate version of the local base sequence with the RB extraction output to generate complex symbols;

(4*d*) removing symbol cyclic shift variation of the complex symbols to generate complex symbols with the symbol cyclic shift variation removed;

(4*e*) performing 12-point IDFT by using the complex symbols with the symbol cyclic shift variation removed to generate a 12-point IDFT output;

(4*f*) performing DMRS/data demux by using the 12-point IDFT output to generate the data values and DMRS values; and (4*g*) performing DMRS despread by using the DMRS values to generate the DMRS despread outputs.

It is noted that in step (4*f*), the data values are N×12 data values and the DMRS values are M×12 DMRS values, where N represents the number of data symbols in one slot and M represents the number of DMRS symbols in one slot. For PUCCH format 1 in normal CP mode, there are 7 symbols in each slot, and symbol 0/1/5/6 are the data symbols, and symbol 2/3/4 are the DMRS symbols. Then, 4×12 data values and 3×12 DMRS values are generated.

In another embodiment, with reference to FIG. 5, the step of generating the SR detection results comprises:

(5*a*) performing data despreader by using an unused orthogonal sequence and the data values to generate first data despreader outputs;

(5*b*) estimating an noise power over data symbols by using the first data despreader outputs;

(5*c*) estimating an noise power over DMRS by using the DMRS despread outputs;

(5*d*) generating a composite noise power by using the noise power over data symbols and the noise power over DMRS symbols; and (5e) performing detection to generate the SR detection results.

From the embodiments of the apparatuses, the unused orthogonal sequence is [1 1 −1 −1]. The noise power over data symbols can be calculated as:

$$\sigma_{data}^2 = \underset{a,n_s=0,1,\tau=0,\ldots,11}{Avg} \{|O(a, n_s, \tau)|^2\},$$

and the noise power over DMRS symbols can be calculated as $$\sigma_{DMRS}^2 = \frac{1}{T+1} \sum_{n \in \{u_0, u_1, \ldots, u_T\}} Z(n).$$

The composite noise power can be generated by averaging the noise power over DMRS and the noise power over data symbols. The detection threshold can be set to a few dBs over the composite noise power.

In another embodiment, with reference to FIG. 7, the step of generating the ACK/NAK/CQI signal for the concerned UE comprises:

(7a) performing data despreader by using the orthogonal sequence index and the data values to generate second data despreader output;

(7b) performing Maximum Ratio Combining (MRC) by using the second data despreader output and the user data extraction output to generate MRC output;

(7c) performing demodulation by using the MRC output to generate a demodulation output; and (7d) performing post processing by using the demodulation output to generate the ACK/NAK/CQI signal for the concerned UE.

From the embodiments of the apparatuses, the orthogonal sequence index is 0, 1, or 2.

Industrial Applicability

The method and apparatus for receiving PUCCH in LTE system of the present document have the following industrial applicability: 1) simplicity and extendibility, specifically, the whole processing can be split into RB-level and user-level, with very little cost even for a large number of users; 2) unique noise power estimation by using the unused orthogonal sequence in the data symbols, NOT only at DMRS symbols, which lead to more accurate noise power estimate and thus higher detection performance.

While embodiment of the document have been illustrated and described, it is not intended that these embodiments illustrate and describe all possible forms of the document. Rather, the words used in the specification are words of description rather than limitation, and it is understood that various changes and modifications may be made without departing from the spirit and scope of the document.

What is claimed is:

1. An apparatus for receiving Physical Uplink Control Channel (PUCCH) in Long Term Evolution (LTE) system, comprising:

a plurality of blocks of system Fast Fourier Transform (FFT), each of the plurality of blocks of system FFT performing system FFT on data from corresponding one of a plurality of antennas;

a block of allocated logic resource index table for generating an allocated logic resource index table in which a logical resource index corresponds to a logical Resource Block (RB) index, a cyclic shift and an orthogonal sequence index;

a block of local base sequence generator for generating a local base sequence;

a plurality of blocks of PUCCH RB processing units, each of the plurality of blocks of PUCCH RB processing units receiving the allocated logic resource index table and the local base sequence and an output of corresponding one of the plurality of blocks of system FFT, and generating DeModulation Reference Signal (DMRS) despread outputs and data values;

a block of SR detection for receiving the data values and the DMRS despread outputs, and for generating Scheduling Request (SR) detection results;

a plurality of blocks of user data extraction, each of the plurality of blocks of user data extraction receiving the data values and the DMRS despread outputs, and performing user data extraction; and a plurality of blocks of PUCCH user processing units, each of the plurality of blocks of PUCCH user processing units receiving an orthogonal sequence index, the data values and an output from corresponding one of the plurality of blocks of user data extraction, and generating an Acknowledgement/Non-Acknowledgement/Channel Quality Indicator (ACK/NAK/CQI) signal for a concerned User Equipment (UE);

wherein one block of system FFT, one block of PUCCH RB processing unit, one block of user data extraction and one block of PUCCH user processing unit correspond to one antenna;

wherein the apparatus receiving PUCCH signals of multiple UEs at the same time.

2. An apparatus according to claim 1, wherein each of the plurality of blocks of PUCCH RB processing unit is configured to comprise:

a sub-block of conjugate for receiving the local base sequence, and for generating a conjugate version of the local base sequence, a sub-block of RB extraction for receiving the allocated logic resource index table and the output of corresponding one of the plurality of blocks of system FFT, and for performing RB extraction;

a sub-block of multiplication for receiving outputs from the sub-block of conjugate and the sub-block of RB extraction, and for performing multiplication calculation;

a sub-block of SysVar removal for receiving an output of the sub-block of multiplication, and for generating complex symbols with symbol cyclic shift variation removed;

a sub-block of 12-point Inverse Discrete Fourier Transform (IDFT) for receiving an output of the sub-block of SysVar removal, and for performing 12-point IDFT, a sub-block of DMRS/data demux for receiving an output of the sub-block of 12-point IDFT, and for splitting DMRS symbols and Data symbols in one TTI to generate the data values and DMRS values, 36 sub-blocks of DMRS despreader for receiving the DMRS values, and for generating the DMRS despread outputs.

3. An apparatus according to claim 1, wherein the block of SR detection is configured to comprise:

a plurality of sub-blocks of data despreader, each of the plurality of sub-blocks of data despreader receiving the data values and an unused orthogonal sequence, and performing inner product calculation;

a sub-block of noise power estimate from data symbols for receiving outputs of the plurality of sub-blocks of data despreader, and for estimating an noise power over data symbols;

a sub-block of noise power estimate from DMRS symbols for receiving the DMRS despread outputs from the plurality of blocks of PUCCH RB processing units, and for estimating an noise power over DMRS symbols;

a sub-block of composite noise power for receiving the noise power over data symbols and the noise power over DMRS symbols, and for generating a composite noise power; and a sub-block of detection for receiving the composite noise power, and for performing detection to generate the SR detection results.

4. An apparatus according to claim 3, wherein the unused orthogonal sequence is [1 1-1 -1].

5. An apparatus according to claim 3, wherein the sub-block of noise power estimate from data symbols is configured to calculated the noise power over data symbols as:

$$\sigma_{data}^2 = \underset{a, n_s=0,1,\tau=0,\ldots,11}{Avg} \{|O(a, n_s, \tau)|^2\}, \text{wherein}$$

$$O(a, n_s, \tau) = \frac{1}{4} \sum_{l=0,1,5,6} R_{cs}(a, n_s, l, \tau) \cdot W(l),$$

$W(0)=1$, $W(1)=1$, $W(5)=-1$, $W(6)=-1$; and $\alpha$ is a number of one antenna, $\tau$ is a cyclic shift, $n_s$ is a slot number, $R_{cs}$ $(a, n_s, l, \tau)$ is a correlation results for slot $n_s$, symbol l and cyclic shift $\tau$ from the antenna of number a and can be obtained from the sub-block of DMRS/Data demux.

6. An apparatus according to claim 3, wherein the sub-block of noise power estimate from DMRS symbols is configured to calculated the noise power over DMRS as:

$$\sigma_{DMRS}^2 = \frac{1}{T+1} \sum_{n \in \{u_0, u_1, \ldots, u_T\}} Z(n),$$

wherein $\{u_0, u_1, \ldots, u_T\}$ are unused positions which can be obtained from the allocated logic resource index table, T+1 is the number of the unused positions, and Z(n) is the DMRS despread outputs.

7. An apparatus according to claim 3, wherein the sub-block of composite noise power is configured to calculate the composite noise power by averaging the noise power over DMRS symbols and the noise power over data symbols.

8. An apparatus according to claim 3, wherein a detection threshold of the sub-block of detection is set to a few dBs over the composite noise power.

9. An apparatus according to claim 1, wherein each of the plurality of blocks of PUCCH user processing unit is configured to comprise:

a plurality of sub-blocks of data despreader, each of the plurality of sub-blocks of data despreader receiving the data values and the orthogonal sequence index, and performing inner product calculation;

a sub-block of Maximum Ratio Combining (MRC) for receiving outputs from the plurality of sub-blocks of data despreader and outputs from the plurality of blocks of user data extraction;

a sub-block of demodulation for receiving an output from the sub-block of MRC and for performing demodulation; and a sub-block of post processing for receiving and post processing an output from the sub-block of demodulation to generate the ACK/NAK/CQI signal for the concerned UE.

10. An apparatus according to claim 9, wherein the orthogonal sequence index is 0, 1, or 2.

11. A method for receiving Physical Uplink Control Channel (PUCCH) in Long Term Evolution (LTE) system, comprising:

performing system Fast Fourier Transform (FFT) on data from antennas to generate a system FFT output;

generating an allocated logic resource index table in which a logical resource index corresponds to a logical Resource Block (RB) index, a cyclic shift and an orthogonal sequence index;

generating a local base sequence;

generating DeModulation Reference Signal (DMRS) despread outputs and data values by using the allocated logic resource index table, the local base sequence and the system FFT output;

generating Scheduling Request (SR) detection results by using the data values and the DMRS despread outputs;

performing user data extraction by using the data values and the DMRS despread outputs to generate user data extraction outputs; and generating an Acknowledgement/Non-Acknowledgement/Channel Quality Indicator (ACK/NAK/CQI) signal for a concerned User Equipment (UE) by using an orthogonal sequence index, the data values and the user data extraction outputs;

thereby receiving PUCCH signals of multiple UEs at the same time.

12. A method according to claim 11, wherein the generating DMRS despread outputs comprises:

generating a conjugate version of the local base sequence;

performing RB extraction by using the allocated logic resource index table and the system FFT output to generate a RB extraction output;

multiplying the conjugate version of the local base sequence with the RB extraction output to generate complex symbols;

removing symbol cyclic shift variation of the complex symbols to generate complex symbols with the symbol cyclic shift variation removed;

performing 12-point Inverse Discrete Fourier Transform (IDFT) by using the complex symbols with the symbol cyclic shift variation removed to generate a 12-point IDFT output;

performing DMRS/data demux by using the 12-point IDFT output to generate the data values and DMRS values; and performing DMRS despread by using the DMRS values to generate the DMRS despread outputs.

13. A method according to claim 11, wherein the generating SR detection results comprises:

performing data despread by using an unused orthogonal sequence and the data values to generate first data despreader outputs;

estimating an noise power over data symbols by using the first data despreader outputs;

estimating an noise power over DMRS symbols by using the DMRS despread outputs;

generating a composite noise power by using the noise power over data symbols and the noise power over DMRS symbols; and performing detection to generate the SR detection results.

14. A method according to claim 13, wherein the unused orthogonal sequence is [1 1 −1 −1].

15. A method according to claim 13, wherein the estimating an noise power over data symbols comprises calculating the noise power over data symbols as:

$$\sigma_{data}^2 = \underset{a, n_s=0,1,\tau=0,\ldots,11}{Avg} \{|O(a, n_s, \tau)|^2\}, \text{wherein}$$

$$O(a, n_s, \tau) = \frac{1}{4} \sum_{l=0,1,5,6} R_{cs}(a, n_s, l, \tau) \cdot W(l),$$

$W(0) = 1, W(1) = 1, W(5) = -1, W(6) = -1$; and $\alpha$ is a number of one antenna, $\tau$ is a cyclic shift, $n_s$ is a slot number, $R_{cs}(a, n_s, l, \tau)$ is a correlation results for slot $n_s$, symbol l and cyclic shift $\tau$ from the antenna of number $\alpha$ and can be obtained by the performing DMRS/data demux.

16. A method according to claim 13, wherein the estimating an noise power over DMRS symbols comprises calculating the noise power over DMRS symbols as:

$$\sigma_{DMRS}^2 = \frac{1}{T+1} \sum_{n \in \{u_0, u_1, \ldots, u_T\}} Z(n),$$

wherein $\{u_0, u_1, \ldots u_T\}$ are unused positions which can be obtained from the allocated logic resource index table, the $T+1$ is the number of the unused positions, and $Z(n)$ is the DMRS despread outputs.

17. A method according to claim 13, wherein the generating a composite noise power comprises averaging the noise power over DMRS symbols and the noise power over data symbols.

18. A method according to claim 13, wherein the performing detection to generate the SR detection results comprises using a detection threshold which is set to a few dBs over the composite noise power.

19. A method according to claim 11, the generating a ACK/NAK/CQI signal for a concerned UE comprises:

performing data despread by using the data values and the orthogonal sequence index to generate second data despreader output;

performing Maximum Ratio Combining (MRC) by using the second data despreader output and the user data extraction outputs to generate MRC output;

performing demodulation by using the MRC output to generate a demodulation output; and performing post processing by using the demodulation output to generate the ACK/NAK/CQI signal for the concerned UE.

20. A method according to claim 19, wherein the orthogonal sequence index is 0, 1, or 2.

* * * * *

UNITED STATES PATENT AND TRADEMARK OFFICE
CERTIFICATE OF CORRECTION

PATENT NO. : 9,451,597 B2  
APPLICATION NO. : 13/809409  
DATED : September 20, 2016  
INVENTOR(S) : Aijun Cao et al.

Page 1 of 1

It is certified that error appears in the above-identified patent and that said Letters Patent is hereby corrected as shown below:

On the Title Page

Item (73) Assignee name should be: ZTE WISTRON TELECOM AB  
Assignee address should be: STOCKHOLM, SWEDEN Signed and Sealed this  
Third Day of January, 2017

Michelle K. Lee  
*Director of the United States Patent and Trademark Office*